(12) United States Patent
Hershman et al.

(10) Patent No.: US 10,303,880 B2
(45) Date of Patent: May 28, 2019

(54) SECURITY DEVICE HAVING INDIRECT ACCESS TO EXTERNAL NON-VOLATILE MEMORY

(71) Applicant: Nuvoton Technology Corporation, Hsin-chu (TW)

(72) Inventors: Ziv Hershman, Givat Shmuel (IL); Dan Morav, Herzliya (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 0 days.

(21) Appl. No.: 14/714,298

(22) Filed: May 17, 2015

(65) Prior Publication Data

US 2016/0026799 A1    Jan. 28, 2016

Related U.S. Application Data

(60) Provisional application No. 62/028,345, filed on Jul. 24, 2014.

(51) Int. Cl.
 *G06F 21/57* (2013.01)
 *H04L 9/32* (2006.01)

(52) U.S. Cl.
 CPC ............ *G06F 21/57* (2013.01); *H04L 9/3234* (2013.01); *G06F 2221/034* (2013.01); *G06F 2221/2107* (2013.01)

(58) Field of Classification Search
 CPC ...................................................... G06F 21/57
 USPC ........................................................... 726/1
 See application file for complete search history.

(56) References Cited

U.S. PATENT DOCUMENTS

| | | | |
|---|---|---|---|
| 9,158,628 B2 | 10/2015 | Maity et al. | |
| 2002/0087872 A1* | 7/2002 | Wells | G06F 21/72 713/193 |
| 2003/0061494 A1 | 3/2003 | Girard et al. | |
| 2005/0021968 A1 | 1/2005 | Zimmer et al. | |
| 2005/0132186 A1* | 6/2005 | Khan | G06F 21/57 713/165 |
| 2006/0107032 A1* | 5/2006 | Paaske | G06F 21/57 713/2 |
| 2008/0276302 A1* | 11/2008 | Touboul | G06F 21/562 726/3 |
| 2008/0282017 A1 | 11/2008 | Carpenter et al. | |
| 2010/0037321 A1* | 2/2010 | Oz | G06F 21/57 726/24 |
| 2012/0163589 A1* | 6/2012 | Johnson | G06F 21/10 380/30 |

(Continued)

OTHER PUBLICATIONS

TCG Software Stack (TSS) Specification Version 1.2, Level 1, Errata A, Part 1: Commands and Structures, 757 pages, Mar. 7, 2007.

(Continued)

*Primary Examiner* — Peter C Shaw
(74) *Attorney, Agent, or Firm* — Kligler & Associates

(57) ABSTRACT

A method in a security device that provides a security service to a host includes receiving a security command from an application program running on the host. The security command is executed by accessing a Non-Volatile Memory (NVM) device external to the security device transparently to the application program via a dedicated device driver, which runs on the host and mediates between the NVM device and the security device.

20 Claims, 2 Drawing Sheets

(56) References Cited

U.S. PATENT DOCUMENTS

2013/0254906 A1\* 9/2013 Kessler .................. G06F 21/57
726/34
2015/0026426 A1\* 1/2015 Sahita ................. G06F 12/1491
711/163

OTHER PUBLICATIONS

TCG PC Client Specific Implementation Specification for Conventional BIOS, Specification Version 1.21 Errata, Revision 1.00, 151 pages, Feb. 24, 2012.
TCG PC Client Specific TPM Interface Specification (TIS), Specification Version 1.3, 112 pages, Mar. 21, 2013.
TPM Main Specification, "Part 1—Design Principles", version 1.2, Revision 116, 184 pages, Mar. 1, 2011.
TPM Main Specification, "Part 2—Structures", version 1.2, Level 2, Revision 116, 201 pages, Mar. 1, 2011.
TPM Main Specification, "Part 3—Commands", version 1.2, Level 2, Revision 116, 339 pages, Mar. 1, 2011.

\* cited by examiner

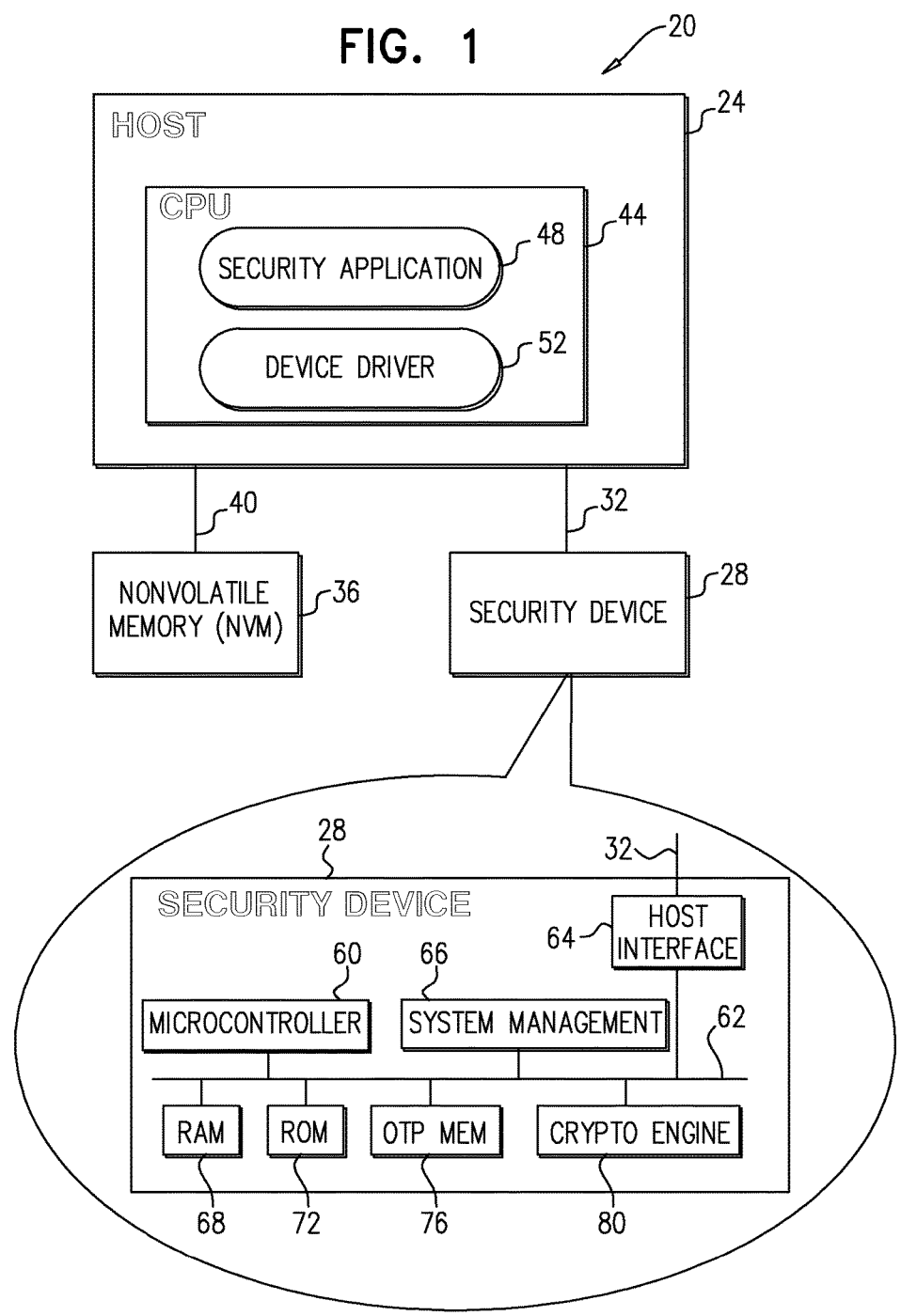

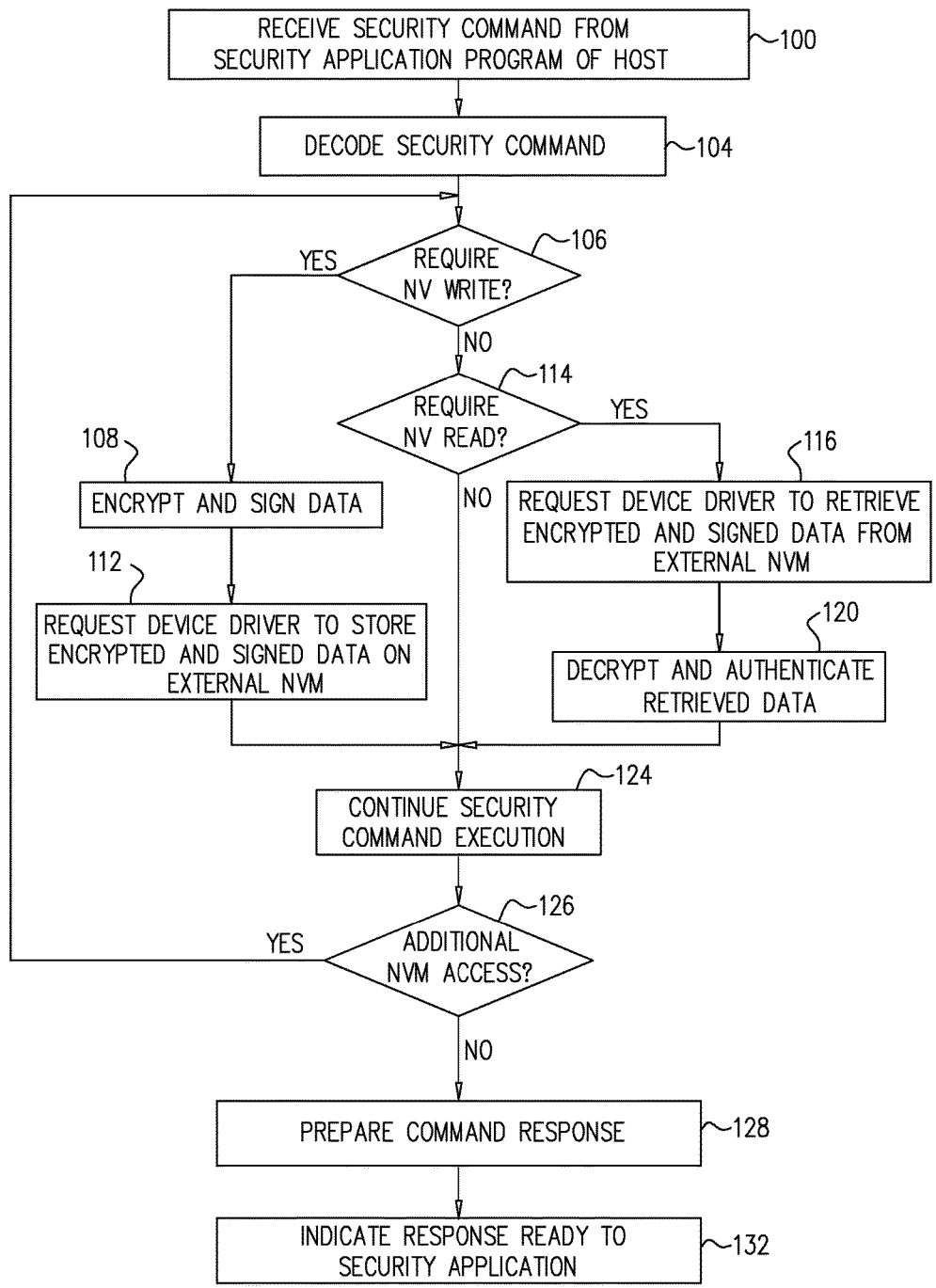

SECURITY DEVICE HAVING INDIRECT ACCESS TO EXTERNAL NON-VOLATILE MEMORY

CROSS-REFERENCE TO RELATED APPLICATIONS

This application claims the benefit of U.S. Provisional Patent Application 62/028,345, filed Jul. 24, 2014, whose disclosure is incorporated herein by reference.

FIELD OF THE INVENTION

The present invention relates generally to secured computing environments, and particularly to methods and systems for trusted computing.

BACKGROUND OF THE INVENTION

Trusted Computing is a security technology in computing systems, developed and promoted, for example, by the Trusted Computing Group (TCG). With trusted computing, the behavior of a computer is enforced by applying cryptographic and other security techniques. For example, U.S. Patent Application Publication 2005/0021968, whose disclosure is incorporated herein by reference, describes a method for providing a secure firmware update. A first authentication credential is securely stored on a platform in an encrypted form using a key generated by a secure token, such as a trusted platform module (TPM). A configuration of the platform is "imprinted" such that an identical configuration is required to access the key used to decrypt the first authentication credential by sealing the key against the platform configuration. During a subsequent firmware update process, a firmware update image containing a second authentication credential is received at the platform. If the platform configuration is the same as when the key was sealed, the key can be unsealed and used for decrypting the first authentication credential. A public key in the first authentication credential can then be used to authenticate the firmware update image via the second authentication credential.

As another example, U.S. Patent Application Publication 2003/0061494, whose disclosure is incorporated herein by reference, describes a method and system for protecting data on a computer. A computer is provided that has a pre-operating system (pre-OS) space and an operating system-present (OS-present) space. Protected storage is accessed from pre-OS space via a trusted platform module (TPM). Similarly, protected storage is accessed from OS-present space via the TPM. As such, from both pre-OS space and OS-present space, a computer may prevent unauthorized users from gaining access to data stored in protected storage.

SUMMARY OF THE INVENTION

An embodiment of the present invention that is described herein provides a method in a security device that provides a security service to a host, including receiving a security command from an application program running on the host. The security command is executed by accessing a Non-Volatile Memory (NVM) device external to the security device transparently to the application program via a dedicated device driver, which runs on the host and mediates between the NVM device and the security device.

In some embodiments, the security device, the dedicated device driver and the NVM device are compliant with respective security standards of the Trusting Computing Group (TCG). In other embodiments, the security device, together with the dedicated device driver and at least a portion of the NVM device storage space, implements a Trusted Platform Module (TPM) in accordance with specifications of the TCG.

In an embodiment, executing the security command includes communicating between both the application program and the dedicated device driver, and the security device over an interface in which the host serves as a master and the security device serves as a slave. In another embodiment, executing the security command includes communicating between the dedicated device driver and the NVM device over the interface. In yet another embodiment, executing the security command includes requesting the device driver, by the security device, to write data to or read data from the NVM device.

In some embodiments, requesting the device driver includes preparing a request internally in the security device, and signaling to the device driver to obtain the request via the interface. In other embodiments, requesting the device driver includes preparing a request in a register of the security device, and waiting for the device driver to obtain the request by polling the register by the device driver. In yet other embodiments, executing the security command includes preparing, in the security device, a command response upon completing execution of the security command, and indicating to the application program that the command response is ready to be read by the application program.

There is additionally provided, in accordance with an embodiment of the present invention, a security device including a host interface and circuitry. The host interface is configured to receive a security command from an application program running on a host. The circuitry is configured to execute the security command by accessing a Non-Volatile Memory (NVM) device external to the security device transparently to the application program via a dedicated device driver, which runs on the host and mediates between the NVM device and the security device.

There is additionally provided, in accordance with an embodiment of the present invention, a security apparatus, including a security device that provides a security service to a host, and a dedicated device driver running on the host. The device driver is configured to mediate between the security device and a Non-Volatile Memory (NVM) device external to the security device. The security device is configured to receive a security command from an application program running on the host, and to execute the security command by accessing the NVM device transparently to the application program via the dedicated device driver.

There is additionally provided, in accordance with an embodiment of the present invention, a computer software product, the product includes a tangible non-transitory computer-readable medium in which program instructions are stored, which instructions, when read by a processor of a host, cause the processor to run a dedicated device driver for mediating between a security device that provides a security service for an application program running on the host and a Non-Volatile Memory (NVM) device external to the security device transparently to the application program via the dedicated device driver.

The present invention will be more fully understood from the following detailed description of the embodiments thereof, taken together with the drawings in which:

BRIEF DESCRIPTION OF THE DRAWINGS

FIG. 1 is a block diagram that schematically illustrates a computing system, in accordance with an embodiment that is described herein; and FIG. 2 is a flow chart that schematically illustrates a method for providing security services in a computing system, in accordance with an embodiment that is described herein.

DETAILED DESCRIPTION OF EMBODIMENTS

Overview

Embodiments of the present invention that are described herein provide improved methods and systems for security in a computing system. In the embodiments that are disclosed herein, a security device serves as a cryptographic co-processor for a host. The host runs a security application, also referred to herein as "application program", that provides security services with the aid of the security device. The security application sends security commands to the security device and receives respective command responses from the security device.

When serving the security application, the security device is sometimes required to access an external Non-Volatile Memory (NVM) device. In the context of the present disclosure and in the claims, the term "NVM device" refers to a multi-time programmable storage device that retains its stored information even when not powered. Example NVM devices include Flash devices and Electrically Erasable Programmable Read-Only Memory (EEPROM) devices.

In the disclosed techniques, the host runs a dedicated device driver, also referred to herein as "device driver" that mediates between the security device and the external NVM device transparently to the security application. The device driver enables the security device to access the external NVM indirectly via the device driver.

The dedicated device driver communicates with the security device over an interface in which the host serves as a master and the security device as a slave. Being a slave, the security device is unable to initiate transactions directly over the interface, for example for accessing the external NVM. Several mechanisms for overcoming this difficulty, i.e., for initiating transactions by the security device in spite of its being a slave, are described herein.

In an example embodiment, the security device receives a security command from the security application of the host. When executing the command requires a write or read access to the external NVM device, the security device requests the device driver to access the external NVM device accordingly. In some embodiments, the security device prepares the request internally and notifies the device driver that the request is ready by generating an interrupt signal. In other embodiments, the device driver obtains the request by polling a register or a memory location in the security device. The device driver reads the request from the security device via the first interface, and writes or reads data from the external NVM as requested. The device driver provides data retrieved from the external NVM to the security device.

The security device may request multiple access cycles to the external NVM device, via the device driver, to execute the security command. For example, the security device may request one or more read operations and/or one or more write operations for executing a single security command. Following the command execution, the security device returns a command response to the security application. The command response may comprise an outcome of a cryptographic operation, error reports and the like.

In some embodiments, the external NVM may comprise a conventional NVM device that is used for additional purposes in the computing system. By using at least part of an existing (typically low cost) NVM device for secure storage, the security device can be designed with no internal NVM or with only a small sized NVM device, thus reducing costs.

Since the host communicates with the security device over an interface in which the host serves as a master and the security device as a slave, the interface needs no bus mastering and arbitration capabilities, which reduces the interface complexity. In addition, interfaces that have no bus mastering support can also be used.

System Description

FIG. 1 is a block diagram that schematically illustrates a computing system 20, in accordance with an embodiment that is described herein. System 20 comprises a host 24, which communicates with a security device 28 via a first interface 32, and with a Non-Volatile Memory (NVM) device 36 via a second interface 40. Security device 28 serves as a cryptographic co-processor for the host.

Host 24 comprises a CPU 44 running a security application 48 and a dedicated device driver 52, which together with security device 28 provide host 24 with functionalities required for implementing trusted computing and other security policies. Security application 48 provides a common application programming interface (API) toward security device 28 for the operating system (OS) and other application programs running on the host.

In some embodiments, system 20 implements a trusted computing system in accordance with standards developed by the Trusted Computing Group (TCG). In such embodiments, security device 28, together with dedicated device driver 52 and at least a portion of the storage space of NVM device 36 may comprise the Trusted Platform Module (TPM). Additionally, security application 48 may comprise the TCG Software Stack (TSS). TPM is specified, for example, in the three-part TPM main specifications, Version 1.2, Level 2, Revision 116, Mar. 1, 2011, which is incorporated herein by reference. The three parts of the TPM main specifications include: "TPM Main Part 1 Design Principles," "TPM Main Part 2 TPM Structures," and "TPM Main Part 3 Commands." The TSS is described, for example, in "TCG Software Stack (TSS) Specification Version 1.2, Level 1, Errata A, Part 1: Commands and Structures," Mar. 7, 2007, which is incorporated herein by reference.

In some embodiments, trusted computing is implemented in a Personal Computer (PC) system. TCG standards for a PC client are described, for example, in "TCG PC Client Specific Implementation Specification for Conventional BIOS," Version 1.21, Errata Revision 1.00, Feb. 24, 2012 (For TPM Family 1.2; Level 2) and in "TCG PC Client Specific TPM Interface Specification (TIS)," Version 1.3, Mar. 21, 2013, which are incorporated herein by reference.

For example, security application 48 provides secure storage services, e.g., controlled access of system resources to stored information. In some embodiments, secure storage is implemented by defining one or more secure storage zones that are accessible under certain predefined conditions. Such conditions may include, for example, address spaces, system state, accessing authorization, physical presence authorization and read/write protection.

In the description that follows we assume that security application 48 is designed to interface security device 28 directly, for example, as specified in the TCG specifications cited above.

In some embodiments, security application 48 provides security services (e.g., for the OS of the host) by sending respective security commands to security device 28 via interface 32. When receiving a security command, security device 28 decodes the command and executes the command accordingly.

The execution of at least some of the security commands, involves accessing a NVM device, for example, to store and retrieve secret information. In some embodiments, the security device comprises an internal (typically small) NVM. In other embodiments, instead of, or in addition to an internal NVM, the security device accesses an external NVM such as NVM 36 that may be used in the system for additional purposes. As noted above, in addition to security application 48, CPU 44 runs dedicated device driver 52 that mediates between security device 28 and NVM device 36. Device driver 52 provides security device 28 with indirect access to external NVM 36, transparently to security application 48.

Security device 28 may request from device driver 52 to access NVM 36 in various ways. In one embodiment, security device 28 prepares the request internally, e.g., in a predefined register, and generates an interrupt signal to notify the device driver to read the request via interface 32. In another embodiment, the device driver polls a register within the security device to identify whether there is a pending request. In yet another embodiment, device driver 52 checks the register value in the security device conditionally, for example, in response to the security application sending a security command to the security device.

When device driver 52 receives a write request from the security device, the device driver stores the respective data in the external NVM via interface 40. In some embodiments, the security device encrypts and/or signs the data before issuing the write request. When device driver 52 receives a read request from the security device, the device driver reads the requested data from the external NVM via interface 40 and delivers the retrieved data to the security device via interface 32. When the retrieved data is encrypted and signed, the security device may authenticate and decrypt the data.

Interfaces 32 and 40 may comprise any suitable interfaces. Interface 32, may comprise, for example, the Low Pin Count bus (LPC), Serial peripheral Interface (SPI) or the Inter-Integrated Circuit ($I^2c$) bus. Interface 40 may comprise, for example, the SPI. In some embodiments interfaces 32 and 40 comprise separate (same or different) interfaces. In other embodiments, interfaces 32 and 40 may comprise the same interface, or share one or more interface signals.

The lower part of FIG. 1 depicts a block diagram of security device 28. In the present example, security device 28 comprises a microcontroller 60, which interconnects with multiple components of the security device via an internal bus 62. Microcontroller 60 serves as the main control unit of the security device. Security device 28 comprises a host interface module 64 for communicating with the host via interface 32.

Microcontroller 60 accepts security commands received via a host interface 64 and executes these commands possibly using other components within the security device, as appropriate. A system management module 66 provides various signals required for operating the device components, such as, for example, power distribution, clock signals and interrupt signals. In some embodiments, module 66 comprises one or more timers that can be used, for example, for time-stamping data.

Security device 28 comprises a Random Access Memory (RAM) 68 that stores temporary data, and possibly code instructions for microcontroller 60. A Read Only Memory (ROM) module 72 stores code instructions for microcontroller 60. ROM 72 may additionally store various constant values. A One Time Programmable (OTP) memory 76 stores the security device configuration, as well as secret keys that are determined at production and are unique per each security device. In some embodiments, the security device comprises, instead of or in addition to OTP memory 76, a EEPROM and/or a Physical Unclonable Function (PUF), which can also be used for storing an internal secret.

Security device 28 further comprises a cryptographic engine 80, which supports various cryptographic functions and algorithms. In some embodiments, cryptographic engine supports crypto primitives and algorithms such as a Random Number Generation (RNG), encryption/decryption algorithms such as the Advanced Encryption Standard (AES), the Rivest-Shamir-Adleman (RSA) cryptosystem for public-key encryption, Error Correction Coding/Decoding and cryptographic hash functions such as the Secure Hash Algorithm (SHA-256). Cryptographic engine 80 provides core cryptographic functions such as encryption/decryption and sign and authentication.

Trusted Computing in a PC Client

In some embodiments, system 20 of FIG. 1 comprises a PC system. Table 1 below summarizes the relationships between various elements of system 20 and corresponding elements of a PC client in accordance with the TCG specifications cited above.

TABLE 1

Elements of system 20 with relation to corresponding PC client elements in accordance with the TCG specifications.

| Component number in FIG. 1 | Component name in FIG. 1 | Component function in a PC computing system (TCG spec) |
|---|---|---|
| 20 | Computing system | PC client in accordance with the TCG specifications |
| 24 | Host subsystem | PC components including a Northbridge, a Southbridge and an X86 CPU |
| 44 | CPU | An X86 CPU |
| 28 | Security device | TPM's protected capabilities and volatile shielded locations |
| 48 | Security application | A software module running on the host that is compliant with the TSS |
| 52 | Device driver | Dedicated proprietary device driver that provides the TPM protected capabilities access to non-volatile shielded locations |
| 36 | Non-Volatile memory | System flash device used as a storage |

TABLE 1-continued

Elements of system 20 with relation to corresponding PC client elements in accordance with the TCG specifications.

| Component number in FIG. 1 | Component name in FIG. 1 | Component function in a PC computing system (TCG spec) |
|---|---|---|
| 32 | First interface | for TPM's non-volatile shielded locations Host-TPM interface such as LPC, SPI, I²C |
| 40 | Second interface | Host-NVM interface such as SPI |

The configuration of system 20 and of security device 28 shown in FIG. 1 are example configurations, which are shown purely for the sake of conceptual clarity. Alternatively, any other suitable computing system and security device configurations can also be used. Elements that are not necessary for understanding the principles of the present invention, such as various interfaces, control circuits, addressing circuits, timing and sequencing circuits and debugging circuits, have been omitted from the figure for clarity.

In the example system configuration shown in FIG. 1, CPU 44, security device 28 and NVM device 36 are implemented as separate Integrated Circuits (ICs). In alternative embodiments, however, at least two of the CPU, security device, and NVM device may be integrated on separate semiconductor dies in a single Multi-Chip Package (MCP) or System on Chip (SoC), and may be interconnected by an internal bus.

The different elements of security device 28 may be implemented using any suitable hardware, such as in an Application-Specific Integrated Circuit (ASIC) or Field-Programmable Gate Array (FPGA). In some embodiments, some elements of the security device can be implemented using software, or using a combination of hardware and software elements. For example, in the present embodiment, cryptographic engine 80 and system management module 66 can be implemented as dedicated hardware modules. As another example, signature calculations as well as encryption/decryption functions can be implemented in hardware in cryptographic engine 80, in software to be executed by microcontroller 60, or in a combination of hardware and software.

In the description that follows and in the claims, the various elements of the security device, not including host interface 64, are collectively referred to as circuitry.

Typically, CPU 44 in host 24 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Example Method Carried Out by the Security Device

FIG. 2 is a flow chart that schematically illustrates a method for providing security services in a computing system, in accordance with an embodiment that is described herein. The method can be executed, for example, by security device 28 of FIG. 1. In describing the method we assume that the security device is part of a computing system such as (or similar to) system 20 of FIG. 1.

The method begins by security device 28 receiving a security command via host interface module 64 (that connects to the host via interface 32), at a reception step 100. The security command originates from security application 48 and identifies one or more cryptographic services to be provided by the security device. At a decoding step 104, the security device decodes the security command as a pre-execution phase. The decoding outcome typically comprises the types of the requested services and possibly one or more parameters, such as, for example, parameters identifying the respective cryptographic primitives, addressing and size information regarding the data on which to apply the services and the like.

To execute the command, the security device may need to access the external NVM. The security device may decide to access the external NVM based on the command parameters. Alternatively or additionally, the decision can depend on internal flags, variables and other data saved on the external NVM and restored, on demand, by the security device.

At a write checking step 106, the security device checks whether executing the command requires an access to the external NVM. When the security device requires to write data to the external NVM the method proceeds to an encrypt and sign step 108. In the present example, the command parameters include plaintext data, and the security device encrypts and/or signs the plaintext data, for example, using cryptographic engine 80, as specified by the security command. Following step 108, the encrypted and signed data is ready to be stored in the external NVM.

At a write requesting step 112, the security device requests from device driver 52 to store the data outcome of step 108 in the external NVM. As noted above, the security device operates as a slave of interface 32, and may request the storage operation in various ways, as described above, for example, by generating an interrupt signal to the host. In response to the request, the device driver reads the data that was encrypted and signed at step 108 from the security device via interface 32 and stores the data in the external NVM via interface 40.

When at step 106 the security device does not require writing to the external NVM, the method proceeds to a read checking step 114, in which the security device checks whether executing the command requires a read access to the external NVM. If so, the method proceeds to a read requesting step 116, in which the security device requests from device driver 52 to read data from the external NVM. In response to the read request, the device driver reads the requested data from external NVM 36 via interface 40 and delivers the retrieved data to the security device via interface 32. At a decryption and authentication step 120, the security device authenticates and decrypts the read data, e.g., using cryptographic engine 80.

Following step 112 or 120, or when the check result at step 114 is negative, the method proceeds to a continue command execution step 124. At step 124 the security device executes the security command, or part thereof, possibly using data retrieved from the external NVM. At a loop termination step 126, the security device checks whether additional accesses to the external NVM are needed to complete executing the command. When additional accesses are required, the method loops back to step 106. Otherwise, the method proceeds to a response preparation step 128.

At step 128, the security device prepares a command response, which may comprise, for example, an outcome of a cryptographic function, error reports and the like. At a response notification step 132, the security device notifies the security application that the command response is ready. The security device may notify the security application, for example by generating an interrupt signal, or the security application may poll a predefined register in the security device, similarly to the methods described above for requesting the device driver. The security application then reads the command response from the security device via interface 32, and the method terminates.

The method of FIG. 2 is given by way of example, and other suitable methods can also be used. For example, in some embodiments, the security command may indicate writing plaintext to or reading plaintext from the external NVM. In such embodiments, steps 108 and 120 may be skipped.

Although the embodiments described above refer mainly to a computing system such as a PC, similar embodiments can be implemented in other computing systems such as mobile devices, internet of things, smart metering, automotive and industrial systems/environments.

The disclosed techniques can be used for various secure storage applications, such as, for example, secured or trusted booting. For example, the Trusted computing Group (TCG) specifies the Unified Extensible Firmware Interface (UEFI) supporting the Secure Boot feature that is included in the Windows 8 operating system. As another example, the Chromium operating system includes the Verified Boot feature as a trusted booting solution. These features may be implemented using the methods and systems described herein.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising: in a security co-processor, providing a security service to a host, wherein: the host connects via a first interface to the security co-processor and via a second interface to a Non-Volatile Memory (NVM) device; the NVM device is external to both the host and the security co-processor; and the security co-processor resides externally to the host, wherein the host runs (i) an application program and (ii) a dedicated device driver that enables the security co-processor to access the NVM device via the first and second interfaces, and wherein the NVM device is accessible to the co-processor indirectly via the device driver of the host; receiving by the security co-processor, from the application program via the first interface, a security command whose execution requires accessing the NVM device by the security co-processor and wherein executing the security command comprises accessing the NVM by the security co-processor, indirectly via the dedicated device driver and without involving the application program; and executing the security command received from the application program, by the security co-processor, by accessing the NVM device via the dedicated device driver of the host and the first and second interfaces.

2. The method according to claim 1, wherein the security co-processor, the dedicated device driver and the NVM device are compliant with respective security standards of a Trusting Computing Group (TCG).

3. The method according to claim 1, wherein the security co-processor implements, together with the dedicated device driver and at least a portion of a storage space of the NVM device, a Trusted Platform Module (TPM) in accordance with specifications of a TCG.

4. The method according to claim 1, wherein executing the security command comprises communicating between the application program and the security co-processor, and between the dedicated device driver and the security co-processor, over the first interface in which the host serves as a master and the security co-processor serves as a slave.

5. The method according to claim 1, wherein executing the security command comprises causing the dedicated device driver to communicate with the NVM device over the second interface.

6. The method according to claim 1, wherein executing the security command comprises requesting the dedicated device driver, by the security co-processor, to write data to or read data from the NVM device.

7. The method according to claim 6, wherein requesting the dedicated device driver comprises preparing a request internally in the security co-processor, and signaling to the dedicated device driver to obtain the request via the first interface.

8. The method according to claim 6, wherein requesting the dedicated device driver comprises preparing a request in a register of the security co-processor, and waiting for the dedicated device driver to obtain the request by polling the register by the dedicated device driver.

9. The method according to claim 1, wherein executing the security command comprises preparing, in the security co-processor, a command response upon completing execution of the security command, and indicating to the application program that the command response is ready to be read by the application program.

10. A security co-processor, comprising: a first interface, which is configured to: connect to a host, which connects via a second interface to a Non-volatile Memory (NVM) device that is external to both the host and the security co-processor, wherein the host runs (i) an application program and (ii) a dedicated device driver that enables the security co-processor, which resides externally to the host, to access the NVM device via the first and second interface and wherein the NVM device is accessible to the co-processor indirectly via the device driver of the host; and receive from the application program a security command whose execution requires accessing the NVM device by the security co-processor and wherein executing the security command comprises accessing the NVM by the security co-processor, indirectly via the dedicated device driver and without involving the application program; and circuitry, which is configured to execute the security command received from the application program, by accessing the NVM device via the dedicated device driver of the host and the first and second interfaces.

11. The security co-processor according to claim 10, wherein the security co-processor implements, together with the dedicated device driver and at least a portion of a storage space of the NVM device, a Trusted Platform Module (TPM) in accordance with specifications of a TCG.

12. The security co-processor according to claim 10, wherein the circuitry is configured to execute the security command by communicating between the application program and the security co-processor, and between the dedicated device driver and the security co-processor, over the first interface in which the host serves as a master and the security co-processor serves as a slave.

13. The security co-processor according to claim 10, wherein the circuitry is configured to execute the security command by causing the dedicated device driver to communicate with the NVM device over the second interface.

14. The security co-processor according to claim 10, wherein the circuitry is configured to request the dedicated device driver to write data to or read data from the NVM device.

15. The security co-processor according to claim 14, wherein the circuitry in configured to request the dedicated device driver by internally preparing a request for the dedicated device driver and signaling the dedicated device driver, to obtain the request via the first interface.

16. The security co-processor according to claim 10, wherein the circuitry is configured to prepare a command response upon completing execution of the security command, and to indicate to the application program that the command response is ready to be read by the application program.

17. A security apparatus, comprising: a security co-processor that provides a security service to a host, wherein the security co-processor resides externally to the host, and the host connects via a first interface to the security co-processor and via a second interface to a Non-Volatile Memory (NVM) device that is external to both the host and the security co-processor, wherein the host runs at least an application program; and a dedicated device driver running on the host, wherein the dedicated device driver is configured to enable the security co-processor to access the NVM device via the first and second interfaces, wherein the NVM device is accessible to the co-processor indirectly via the device driver of the host, and wherein the security co-processor is configured to receive from the application program a security command whose execution requires accessing the NVM device by the security co-processor and wherein executing the security command comprises accessing the NVM by the security co-processor, indirectly via the dedicated device driver and without involving the application program, and to execute the security command by accessing the NVM device via the dedicated device driver of the host and the first and second interfaces.

18. The security apparatus according to claim 17, wherein the security co-processor, dedicated device driver and NVM device are compliant with respective security standards of a Trusting Computing Group (TCG).

19. The security apparatus according to claim 17, wherein both the application program and the dedicated device driver are configured to communicate with the security co-processor over the first interface in which the host serves as a master and the security co-processor serves as a slave.

20. A computer software product, the product comprising a tangible non-transitory computer-readable medium in which program instructions are stored, which instructions, when read by a processor of a host, which connects via a first interface to a security co-processor, which resides externally to the host, and via a second interface to a Non-Volatile Memory (NVM) device that is external to both the host and the security co-processor, wherein the host runs a dedicated device driver that enables the security co-processor to access the NVM device via the first and second interfaces, cause the processor to run an application program and (ii) a dedicated device driver that enables the security co-processor to access the NVM device via the first and second interfaces, wherein the NVM device is accessible to the co-processor indirectly via the device driver of the host, and wherein the security co-processor is configured to receive from the application program a security command whose execution requires accessing the NVM device by the security co-processor and wherein executing the security command comprises accessing the NVM by the security co-processor, indirectly via the dedicated device driver and without involving the application program, and to execute the security command by accessing the NVM device via the dedicated device driver of the host and the first and second interfaces.

* * * * *